(12) United States Patent
Deloyer

(10) Patent No.: US 11,999,466 B2
(45) Date of Patent: Jun. 4, 2024

(54) ULTRA-WIDE-CHORD PROPELLER

(71) Applicant: Skydio, Inc., Redwood City, CA (US)

(72) Inventor: Michael S. Deloyer, Etobicoke (CA)

(73) Assignee: Skydio, Inc., San Mateo, CA (US)

( * ) Notice: Subject to any disclaimer, the term of this patent is extended or adjusted under 35 U.S.C. 154(b) by 192 days.

(21) Appl. No.: 17/094,960

(22) Filed: Nov. 11, 2020

(65) Prior Publication Data
US 2021/0147091 A1    May 20, 2021

Related U.S. Application Data

(60) Provisional application No. 62/935,333, filed on Nov. 14, 2019.

(51) Int. Cl.
*B64C 11/18* (2006.01)
*B64C 39/02* (2023.01)

(52) U.S. Cl.
CPC ............ *B64C 11/18* (2013.01); *B64C 39/024* (2013.01)

(58) Field of Classification Search
CPC .............................. B64C 11/18; B64C 27/467
See application file for complete search history.

(56) References Cited

U.S. PATENT DOCUMENTS

| | | |
|---|---|---|
| 33,077 A | 8/1861 | Elliot |
| 793,717 A | 7/1905 | Dixon |
| 1,540,105 A | 12/1922 | Cook, Jr. |
| 1,506,937 A * | 9/1924 | Miller .................. F04D 29/384 |
| | | 416/223 R |
| 1,597,175 A | 3/1925 | Boening |
| 2,561,705 A | 7/1951 | Lochman |
| 2,929,580 A | 3/1960 | Ciolkosz |
| 2,938,585 A | 5/1960 | Fanti |
| 3,106,369 A | 10/1963 | Borst |
| 3,127,093 A | 3/1964 | Sudrow |
| 3,163,119 A | 12/1964 | Huppert et al. |
| 3,226,031 A | 12/1965 | Holland, Jr. |

(Continued)

FOREIGN PATENT DOCUMENTS

| CN | 1334218 A | 2/2002 |
|---|---|---|
| CN | 106904268 A | 6/2017 |

(Continued)

OTHER PUBLICATIONS

International Search Report and Written Opinion dated Jan. 21, 2021 in respect of PCT/CA2020/051521.

*Primary Examiner* — Joshua J Michener
*Assistant Examiner* — Arfan Y. Sinaki
(74) *Attorney, Agent, or Firm* — Young Basile Hanlon & MacFarlane, P.C.

(57) ABSTRACT

The propeller described herein may increase the pressure differential to be generated at/near a blade tip and, at least in some embodiments, to allow for the greatest pressure differential to be generated at/near the blade tip. Increasing the pressure differential in the blade tip region may promote formation of blade tip vortices when the propeller is in use. The propeller may utilize these blade tip vortices as effective mass flow, which can contribute to the thrust force generated by the propeller. That is, by designing the propeller to form and utilize blade tip vortices, the mass flow of air over the blades may be increased, thereby increasing the amount of thrust generated by the propeller.

15 Claims, 16 Drawing Sheets

(56) References Cited

U.S. PATENT DOCUMENTS

| | | | |
|---|---|---|---|
| 3,299,821 A | 1/1967 | Silvern | |
| 3,442,220 A | 5/1969 | Mottram et al. | |
| 3,697,193 A | 10/1972 | Phillips | |
| 3,934,410 A | 1/1976 | Williams | |
| 4,073,601 A | 2/1978 | Kress | |
| 4,171,183 A | 10/1979 | Cornell et al. | |
| 4,412,664 A * | 11/1983 | Noonan | B64C 3/14 416/223 R |
| 4,416,434 A * | 11/1983 | Thibert | B64C 27/467 416/223 R |
| 4,564,337 A * | 1/1986 | Zimmer | B64C 11/18 416/223 R |
| 4,652,213 A * | 3/1987 | Thibert | B64C 11/18 416/223 R |
| 4,789,306 A * | 12/1988 | Vorus | B63H 1/26 416/243 |
| 4,802,822 A | 2/1989 | Gilgenbach et al. | |
| 4,810,167 A | 3/1989 | Spoltman et al. | |
| 4,830,574 A * | 5/1989 | Wainauski | B64C 27/467 416/223 R |
| 4,840,541 A * | 6/1989 | Sakane | F04D 29/384 416/223 R |
| 4,844,698 A | 7/1989 | Gornstein et al. | |
| 4,941,803 A * | 7/1990 | Wainauski | B64C 11/18 416/223 R |
| 5,141,400 A | 8/1992 | Murphy et al. | |
| 5,145,428 A | 9/1992 | Harrison | |
| 5,167,489 A | 12/1992 | Wadia et al. | |
| 5,236,310 A | 8/1993 | Koepsel et al. | |
| 5,292,088 A | 3/1994 | Lemont | |
| 5,297,931 A | 3/1994 | Yapp et al. | |
| 5,299,914 A | 4/1994 | Schilling | |
| 5,616,004 A * | 4/1997 | Alizadeh | F04D 29/384 416/169 A |
| 5,769,607 A | 6/1998 | Neely et al. | |
| 5,791,878 A * | 8/1998 | Wainauski | B64C 11/18 416/243 |
| 5,961,067 A | 10/1999 | Hall et al. | |
| 6,000,911 A | 12/1999 | Toulmay et al. | |
| 6,086,330 A | 7/2000 | Press et al. | |
| 6,116,857 A * | 9/2000 | Splettstoesser | B64C 27/467 416/228 |
| 6,325,597 B1 * | 12/2001 | Kim | F24F 7/007 416/243 |
| 6,379,113 B1 | 4/2002 | Kim | |
| 6,475,045 B2 | 11/2002 | Schultz et al. | |
| 6,565,334 B1 * | 5/2003 | Bradbury | F04D 29/384 417/244 |
| 6,699,016 B1 | 3/2004 | Dean | |
| 6,702,548 B1 | 3/2004 | Lievens et al. | |
| 6,866,482 B2 | 3/2005 | Han | |
| 6,945,758 B1 | 9/2005 | Lievens et al. | |
| 7,037,077 B2 | 5/2006 | Oono et al. | |
| 7,229,248 B2 | 6/2007 | Ito et al. | |
| 7,374,403 B2 | 5/2008 | Decker et al. | |
| 7,476,086 B2 | 1/2009 | Wadia et al. | |
| 7,585,155 B2 | 9/2009 | Park et al. | |
| 7,637,722 B1 | 12/2009 | Koepsel et al. | |
| 8,128,338 B2 * | 3/2012 | Suzuki | F03D 1/0608 415/4.5 |
| 8,419,373 B1 | 4/2013 | Fukami | |
| 8,568,103 B2 | 10/2013 | Enevoldsen et al. | |
| 8,696,318 B2 | 4/2014 | Rolla | |
| 8,747,072 B2 | 6/2014 | Micheli et al. | |
| 9,102,397 B2 | 8/2015 | Wood | |
| 9,284,845 B2 | 3/2016 | Lewis et al. | |
| 9,429,027 B2 | 8/2016 | Mongillo, Jr. et al. | |
| 9,476,385 B2 | 10/2016 | Moore et al. | |
| 9,631,496 B2 | 4/2017 | Vignali et al. | |
| 9,970,453 B2 | 5/2018 | Henner et al. | |
| 10,315,757 B2 | 6/2019 | Ali et al. | |
| 11,162,472 B2 * | 11/2021 | Suzuki | F03D 1/0633 |
| 2003/0007872 A1 * | 1/2003 | Bradbury | F04D 29/384 416/223 R |
| 2005/0053493 A1 * | 3/2005 | Chung | F24F 1/38 417/527 |
| 2006/0088418 A1 | 4/2006 | Pennington et al. | |
| 2006/0269418 A1 * | 11/2006 | Bagai | B64C 27/82 416/223 R |
| 2007/0110582 A1 * | 5/2007 | Bagai | B64C 27/467 416/223 R |
| 2007/0243064 A1 * | 10/2007 | Nakano | F04D 29/384 416/63 |
| 2008/0226454 A1 | 9/2008 | Decker et al. | |
| 2011/0056183 A1 | 3/2011 | Sankrithi et al. | |
| 2012/0207610 A1 | 8/2012 | Yu et al. | |
| 2013/0028747 A1 * | 1/2013 | Henner | F04D 29/386 416/242 |
| 2013/0045107 A1 * | 2/2013 | Topaz | B64C 11/18 416/243 |
| 2013/0156561 A1 * | 6/2013 | Otsuka | F04D 19/002 415/185 |
| 2013/0287582 A1 * | 10/2013 | Kucuk | B63H 1/26 416/223 R |
| 2014/0227099 A1 | 8/2014 | Rolla | |
| 2015/0037164 A1 | 2/2015 | Fizer et al. | |
| 2017/0002659 A1 | 1/2017 | Epstein et al. | |
| 2017/0138370 A1 | 5/2017 | Miller et al. | |
| 2017/0152014 A1 | 6/2017 | Gould et al. | |
| 2017/0252984 A1 | 9/2017 | Ruijter | |
| 2017/0306978 A1 | 10/2017 | Cermak | |
| 2018/0127086 A1 | 5/2018 | Chen et al. | |
| 2019/0048724 A1 * | 2/2019 | Tweedt | B64C 11/18 |
| 2019/0193851 A1 * | 6/2019 | Alfano | B64C 11/18 |
| 2019/0248472 A1 * | 8/2019 | Zipszer | B64C 27/473 |
| 2019/0316599 A1 * | 10/2019 | Iwata | F04D 29/00 |
| 2020/0010173 A1 * | 1/2020 | Scully | B64C 23/069 |
| 2020/0158129 A1 * | 5/2020 | Iwata | F04D 29/667 |
| 2020/0223538 A1 * | 7/2020 | Easley | B64C 27/10 |
| 2020/0331602 A1 * | 10/2020 | Mikic | B64C 11/303 |
| 2021/0197939 A1 * | 7/2021 | Russell | B64C 11/18 |

FOREIGN PATENT DOCUMENTS

| | | | | |
|---|---|---|---|---|
| EP | 0103478 A1 | 3/1984 | | |
| EP | 0489997 A1 | 6/1992 | | |
| EP | 2004483 B1 | 5/2012 | | |
| JP | 2018178867 A | 11/2018 | | |
| KR | 1020090112377 | 10/2009 | | |
| KR | 20180101015 A | 9/2018 | | |
| WO | 2015019597 A1 | 2/2015 | | |
| WO | WO-2015049914 A1 * | 4/2015 | | F04D 17/06 |

* cited by examiner

ULTRA-WIDE-CHORD PROPELLER

CROSS-REFERENCE TO RELATED APPLICATION

This application claims the benefit of U.S. Provisional Patent Application No. 62/935,333, filed Nov. 14, 2019, the contents of which are incorporated herein by reference

FIELD

The described embodiments relate to propellers. In particular, the described embodiments relate to propellers used to provide thrust to an aircraft.

BACKGROUND

It is well known that propellers can be used to convert rotational motion into thrust. For example, U.S. Pat. No. 6,866,482 ("Han") describes a high-performance propeller that has one hub and a plurality of blades, characterized in that a double-side or a single-side arc brim is provided at the tip of each blade. According to Han, the propeller described therein can provide a small induced drag and can convert the centrifugal force to the effective force so as is to increase the differential pressure near the tip of blades and thereby increase the acting force on blades. Under the condition of same power consumption, Han has tested that for the large propeller in the type of lateral inclination that the amount of flow is increased about 12%-17%, which is equivalent to save energy 40%-70%. According to Han, since the fluid dynamic performance presents the aspect ratio approaching infinity, the width of the blades can be increased whereas the induced drag is not increased. According to Han, applying the method of increasing the area of the blades and decreasing the velocity of outflow fluid, the effect on saving of energy can be further improved greatly on the present basis.

U.S. Pat. No. 5,292,088 ("Lemont") describes a low-aspect ratio propeller system with a multiple ring structure formed with a plurality of circular or non-circular, annular, narrow equivalent air foil rings which are held by rails in a predetermined relationship with the propeller blades. The upstream ring is located downstream from the tip vortex of the propeller within the axial span of the propeller. One or more additional downstream-located rings are used so as to provide at least one annular multiple ring-defined pump aperture through which peripheral vortices generated by the propeller blades or fan blades may enhance the mass flow. In one propeller system of Lemont, a low-aspect-ratio propeller is employed with high blade angles of attack and non-stall capability to generate strong vortices which enhance the beneficial effect of the multiple ring structure. According to Lemont, these vortices increase thrust because their induction action on the rings increase beneficial ring flow circulation. Also according to Lemont, augmented ring flow reduces the velocities in the expanding wake by increasing the mass flow and the destruction of tip and root vortices reduces noise. The multiple ring structure also serves as a guard to protect people and animals against the rotating propeller.

SUMMARY OF THE INVENTION

The following is intended to introduce the reader to the detailed description that follows and not to define or limit the claimed subject matter. In general, disclosed herein are one or more propellers.

In a first aspect, some embodiments of the invention provide a propeller including a central hub mountable for drivable rotation about a central axis of rotation and at least one blade extending from the central hub and rotatable about the central axis of rotation by the central hub to generate a backward airflow. Each blade of the at least one blade, (a) extends from a proximal attachment end attached to the central hub to a blade tip, distal from the central hub; (b) comprises a leading edge extending from the proximal attachment end to the blade tip, and a trailing edge extending from the proximal attachment end to the blade tip; and (c) comprises a front surface extending between the leading edge and the trailing edge from the proximal attachment end to the blade tip, and a back surface extending between the leading edge and the trailing edge from the proximal attachment end to the blade tip. At each point along the blade from the proximal attachment end to the blade tip, the blade (a) defines a mean camber line extending between the leading edge and the trailing edge halfway between the front surface and the back surface; and (b) defines a chord line extending straight between the leading edge and the trailing edge, wherein a chord length of the chord line varies along the blade from the proximal attachment end to the blade tip, the chord length is maximized in a blade tip region of the blade, the blade tip region extends from a proximal border to the blade tip, and the proximal border is located toward the blade tip by at least 75% of the distance from the proximal attachment end to the blade tip. At each point along the blade in the blade tip region, the blade defines a maximum camber between 3% and 10% of the chord length at that point, where the maximum camber equals a maximum distance from the mean camber line to the chord line at that point.

In some embodiments, the at least one blade comprises a plurality of blades.

In some embodiments, at each point along the blade from the proximal attachment end to the blade tip region, the blade defines the maximum camber between 3% and 10% of the chord length at that point.

In some embodiments, the proximal border of the blade tip region is located at least 87.5% of the distance from the proximal attachment end to the blade tip.

In some embodiments, each blade of the at least one blade has a first portion, a second portion, a third portion, and a fourth portion. The first portion comprising the 25% of the blade starting at the proximal attachment end. The second portion comprising the 25% of the blade immediately following the first portion. The third portion comprising the 25% of the blade immediately following the second portion. The fourth portion comprising the 25% of the blade immediately following the third portion and ending at the blade tip. The average chord length in the fourth portion is greater than the average chord length in the third portion. The average chord length in the third portion is greater than the average chord length in the second portion. The average chord length in the second portion is greater than the average chord length in the first portion.

In some embodiments, at each point along the blade from the proximal attachment end to the blade tip, a camber percentage is a percentage of maximum camber relative to chord length; and an average of the camber percentages taken at each point along the blade from the proximal attachment end to the blade tip is between 4% and 8%.

In some embodiments, at each point along the blade in the blade tip region, each blade of the at least one blade has a maximum thickness between the front surface and the back surface, the maximum thickness being between 0.01% to 5% of the chord length at that point along the blade.

In some embodiments, at each point along the blade in the blade tip region, the maximum thickness is between 0.1% to 3% of the chord length at that point along the blade.

In some embodiments, at each point along the blade from 50% of the distance from the proximal attachment end to the blade tip, to the blade tip, each blade of the at least one blade has a maximum thickness between the front surface and the back surface, the maximum thickness being between 0.01% to 10% of the chord length at that point along the blade.

In some embodiments, (a) at each point along the blade from the proximal attachment end to the blade tip, a camber percentage is a percentage of the maximum camber relative to the chord length at that point; an average of the camber percentages taken at each point along the blade from the proximal attachment end to the blade tip is between 4% and 8%; (b) each blade of the at least one blade has a maximum thickness between 0.01% to 10% of the chord length at that point along the blade; and (c) for each blade of the at least one blade an average maximum thickness in the first portion is greater than the average maximum thickness of the blade in the second portion, the average maximum thickness of the blade in the second portion is greater than the average maximum thickness of the blade in the third portion, and the average maximum thickness of the blade in the third portion is greater than the average maximum thickness of the blade in the fourth portion.

In some embodiments, each blade of the at least one blade, defines a blade angle measured between a plane orthogonal to the central axis of rotation and the chord line of the blade; such that (a) the blade angle varies along the blade from the proximal attachment end to the blade tip; and, (b) the blade angle is between 13° and 25° at the blade tip.

In some embodiments, the average chord length of the first portion is within 25% of a constant multiplied by 12.5% of the distance from the proximal attachment end to the blade tip. The average chord length of the second portion is within 25% of the constant multiplied by 37.5% of the distance from the proximal attachment end to the blade tip. The average chord length of the third portion is within 25% of the constant multiplied by 62.5% of distance from the proximal attachment end to the blade tip. The average chord length of the fourth portion is within 25% of the constant multiplied by 87.5% of the distance from the proximal attachment end to the blade tip.

In some embodiments, the average chord length of the first portion is within 12.5% of a constant multiplied by 12.5% of the distance from the proximal attachment end to the blade tip. The average chord length of the second portion is within 12.5% of the constant multiplied by 37.5% of the distance from the proximal attachment end to the blade tip. The average chord length of the third portion is within 12.5% of the constant multiplied by 62.5% of distance from the proximal attachment end to the blade tip. The average chord length of the fourth portion is within 12.5% of the constant multiplied by 87.5% of the distance from the proximal attachment end to the blade tip.

According to some aspects, an aircraft includes the propeller as defined in any one of the embodiments described above. The aircraft includes a motor operatively coupled to the propeller to rotate the propeller about the central axis of rotation; and a frame for supporting the propeller and the motor.

In some embodiments, the aircraft is a drone comprising a flight control computer.

BRIEF DESCRIPTION OF THE DRAWINGS

The drawings included herewith are for illustrating various examples of articles and apparatuses of the present specification. In the drawings.

DESCRIPTION OF EXEMPLARY EMBODIMENTS

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

Figure 1:
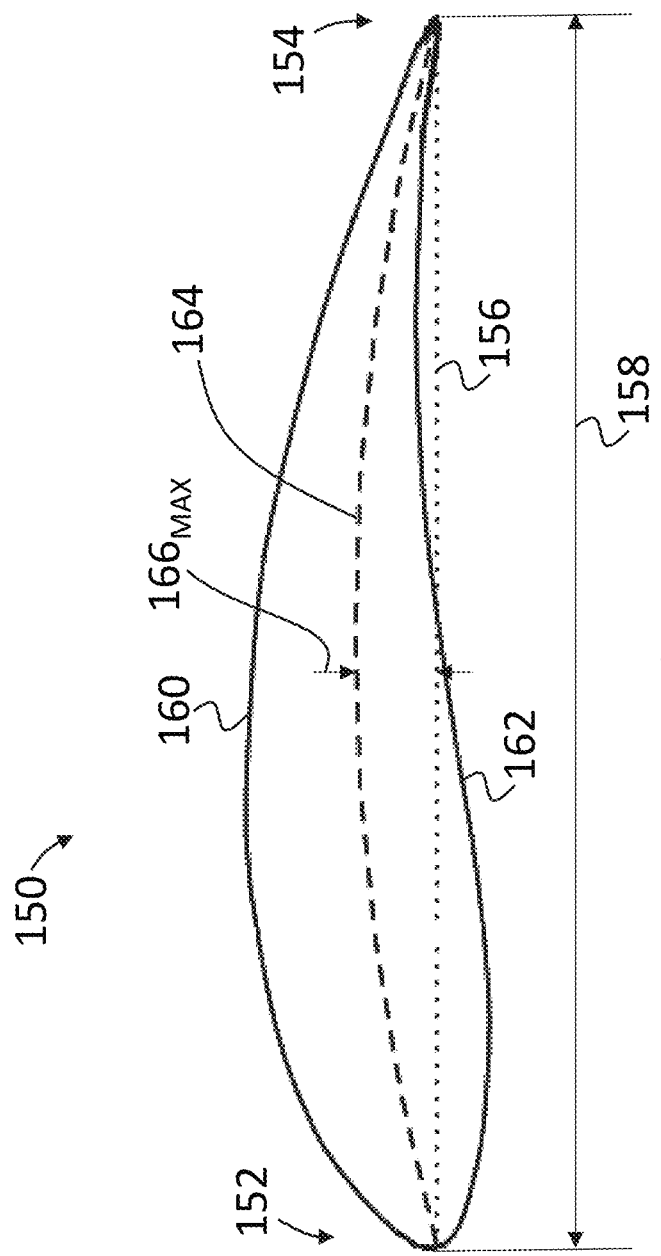
FIG. 1 is a cross-sectional view of a propeller blade of the prior art.

Reference is first made to FIG. 1, in which a cross-sectional view of a blade 150 of the prior art is shown. FIG. 1 is included to help define terms of art used throughout the description and is not meant to limit the teachings herein. Blade 150 has a leading edge 152 and a trailing edge 154. A chord line 156 is defined by a straight line extending from the leading edge 152 to the trailing edge 154. The distance between the leading edge 152 and the trailing edge 154, measured along the chord line 156, defines a chord length 158.

Still referring to FIG. 1, the blade 150 has a front surface 160 and a back surface 162. A mean camber line 164 is defined by a line extending from the leading edge 152 to the trailing edge 154, halfway between the front surface 160 and the back surface 162. Blade 150 also defines a maximum camber $166_{MAX}$ which equals the maximum distance from the mean camber line 164 to the chord line 156 at any point along the blade from leading edge 152 to the trailing edge 154.

Referring now to FIGS. 2-16, shown therein are various example embodiments of a propeller 200. Embodiments of the propeller 200, as described in detail below, may increase the pressure differential to be generated at/near a blade tip 268, i.e., in a blade tip region 270, and, at least in some embodiments, to allow for the greatest pressure differential to be generated at/near the blade tip 268. Increasing the pressure differential in the blade tip region 270 may promote formation of blade tip vortices 290 when the propeller 200 is in use. The propeller 200 may utilize these blade tip vortices 290 as effective mass flow, which can contribute to the thrust force generated by the propeller 200. That is, by designing the propeller 200 to form and utilize blade tip vortices 290, the mass flow of air over the blades may be increased, thereby increasing the amount of thrust generated by the propeller 200.

In summary, embodiments of the propeller 200 described herein are designed with at least one blade 250 that may a) have a maximum chord length at/near the blade tip; b) be thin; c) highly cambered; and (d) have a pitch to diameter ratio of approximately 1:1 (in static thrust conditions). This design can result in blade tip vortices being smoothly transitioned and rapidly dissipated into a relative axial direction, therefore minimizing the strength of blade tip vortices, resulting in increased thrust and efficiency, and decreased noise.

Figure 2:
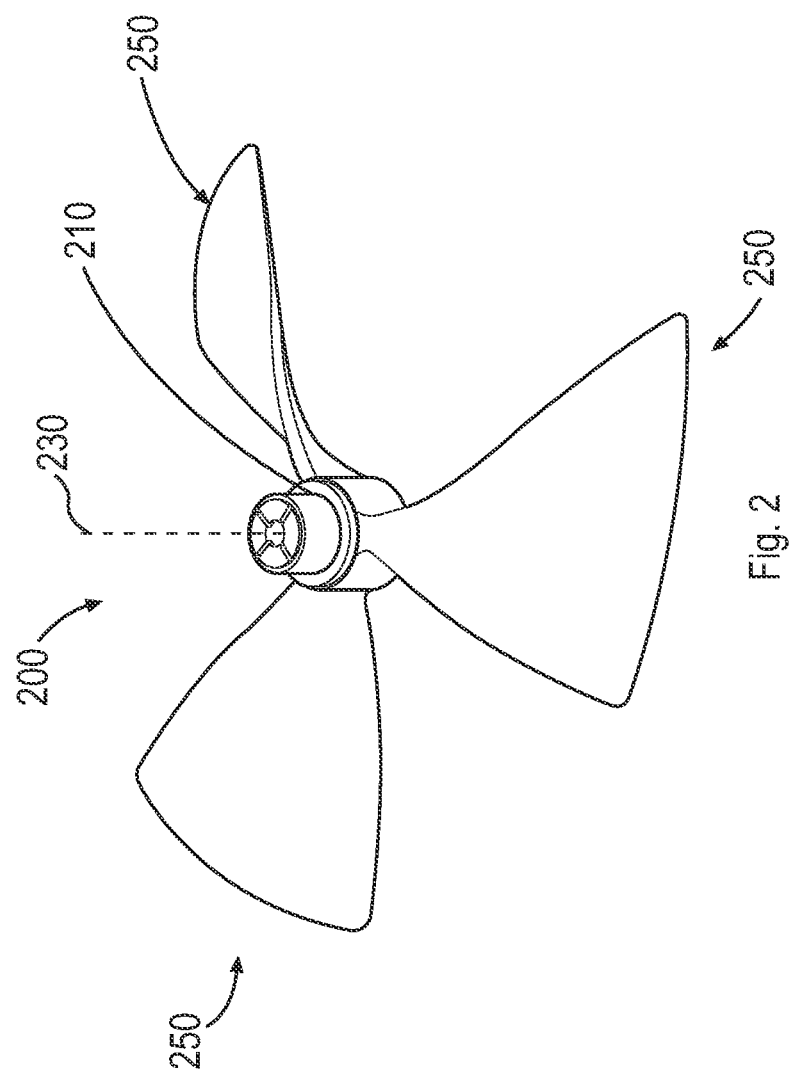
FIG. 2 is a perspective view of a propeller.

Referring now to FIG. 2, shown therein is an example of one embodiment of the propeller 200. The propeller 200 shown in FIG. 2 includes a central hub 210. Central hub 210 is mountable for drivable rotation about central axis of rotation 230. For example, central hub 210 may be mounted to a drive shaft that is connected to a motor. Each embodiment of the propeller 200 also includes at least one blade 250. As shown in FIGS. 2, 3, 5, and 10-13, in some examples, the propeller 200 includes three blades 250. In other examples, see for example FIGS. 9 and 14 the propeller 200 includes two blades 250. In other examples, the propeller 200 may include one blade 250 or more than three blades 250, for example, six blades 250.

Figure 7:
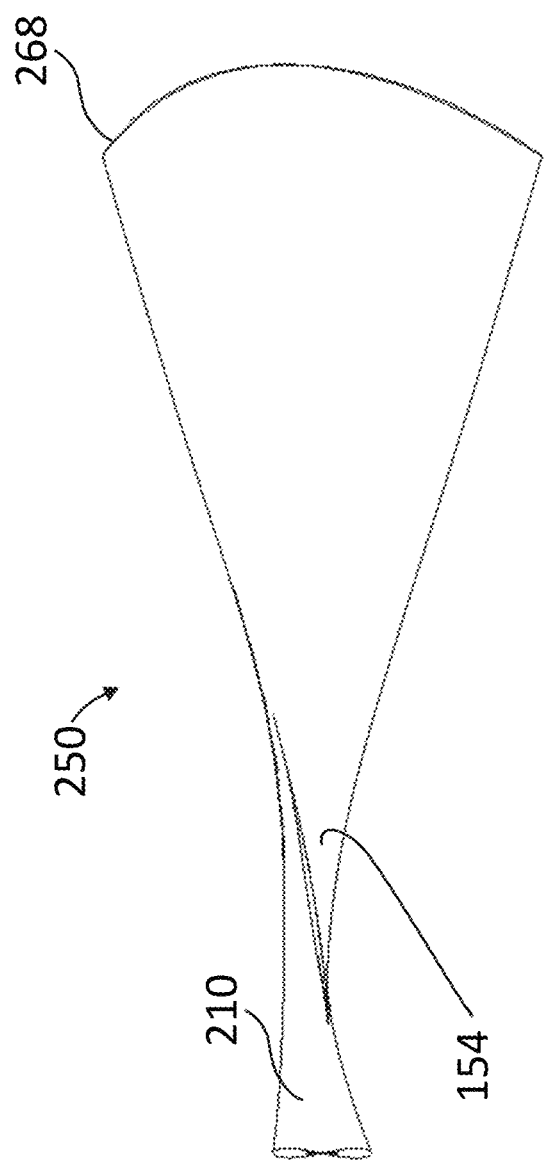
FIG. 7 is a perspective view of an alternative embodiment of a blade.
Figure 8:
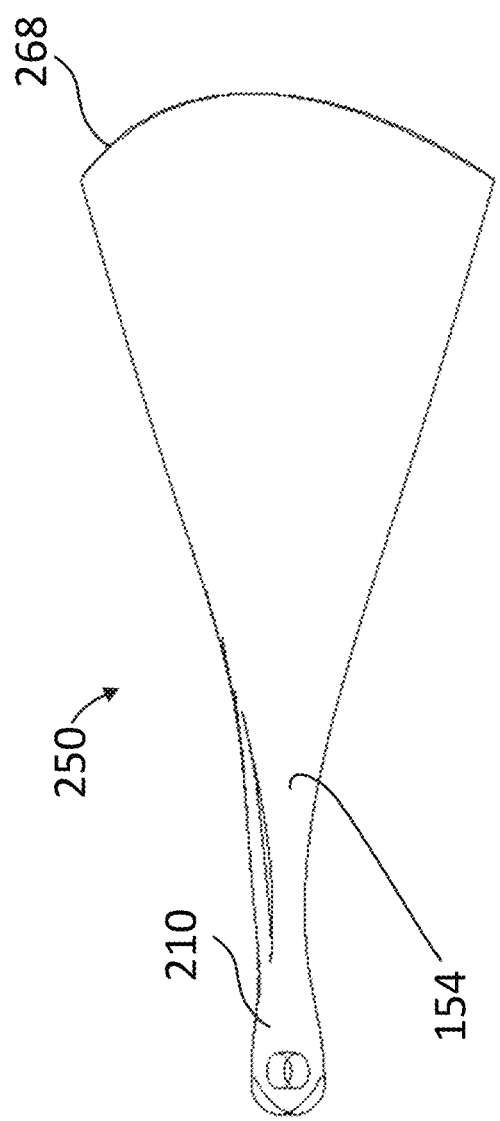
FIG. 8 is a perspective view of an alternative embodiment of a blade.

As shown in FIG. 2, the at least one blade 250 may extend from the central hub 210. In such an example, the at least one blade 250 is rotatable about the central axis of rotation 230 by the central hub 210. That is, rotation of the central hub 210 results in rotation of the at least one blade 250. In some examples, not shown, the central hub may be a drive shaft and each blade 250 may directly connect to the drive shaft. In other examples, the central hub may include an extension or protrusion from which the blade 250 may extend. Other permutations of the central hub 210 and methods of connecting the blade 250 to the hub 210 may exist. For example, referring now to FIG. 7, shown therein is a blade 250 having a variable-pitch hub attachment profile. As a second example, referring now to FIG. 8, shown therein is a folding hub attachment profile. In each of the examples described above, the blade 250 and the hub 210 may be individual components joined together or may be formed of a single monolithic work piece. When in use, rotation of the at least one blade 250 generates an airflow. Depending on the direction of rotation, the airflow may be backwards or forwards.

Figure 3:
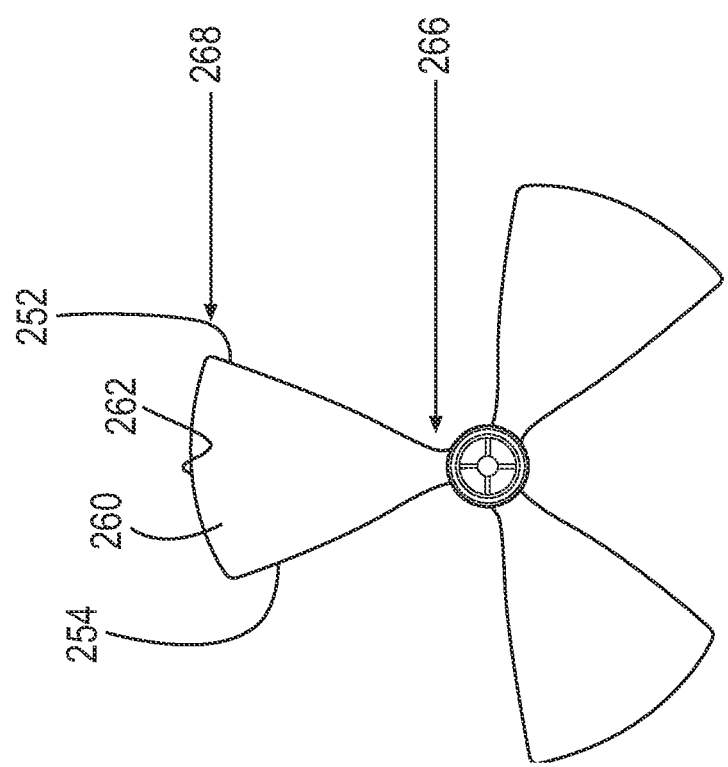
FIG. 3 is a top view of the propeller of FIG. 2.
Figure 9:
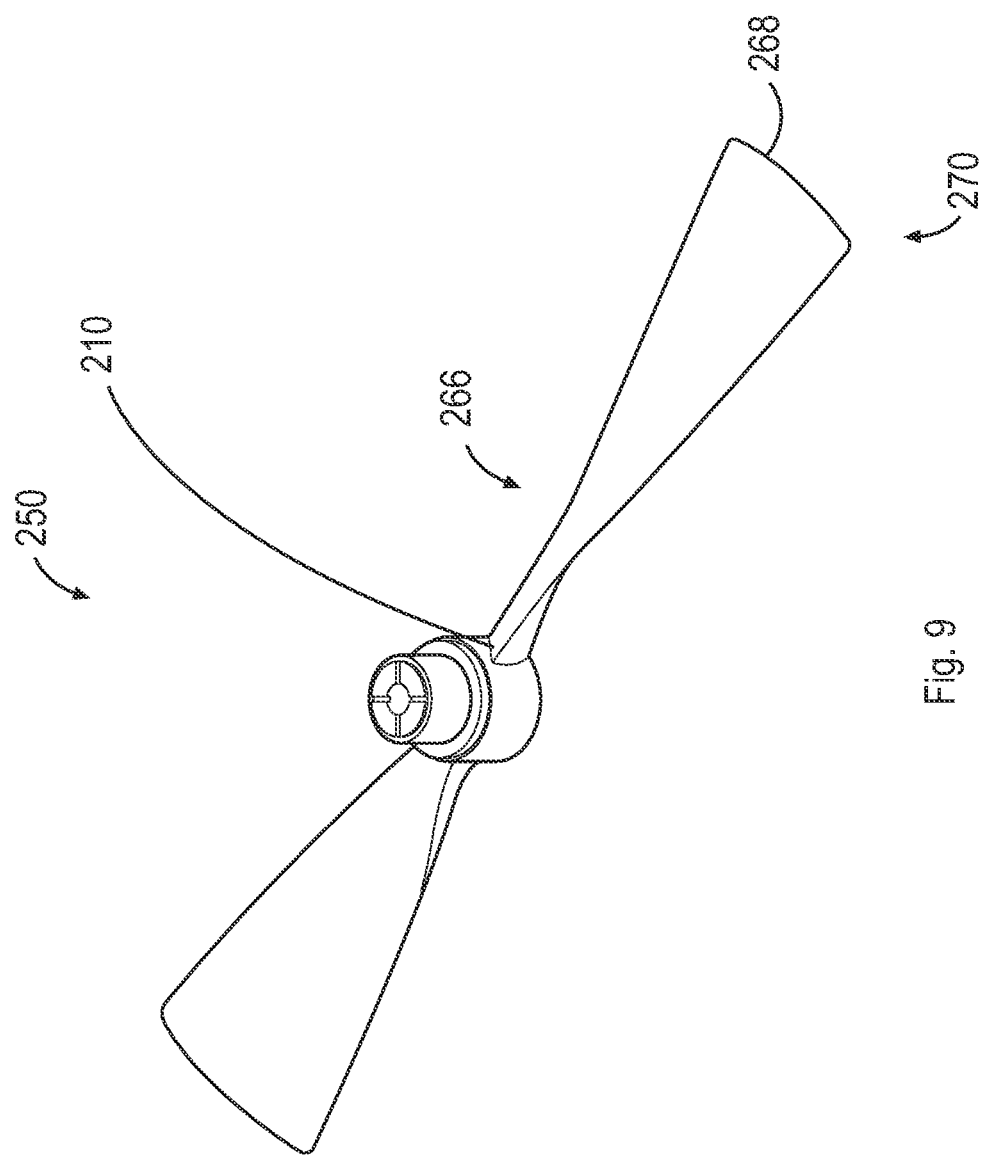
FIG. 9 is a perspective view of an alternative embodiment of a propeller.
Figure 10:
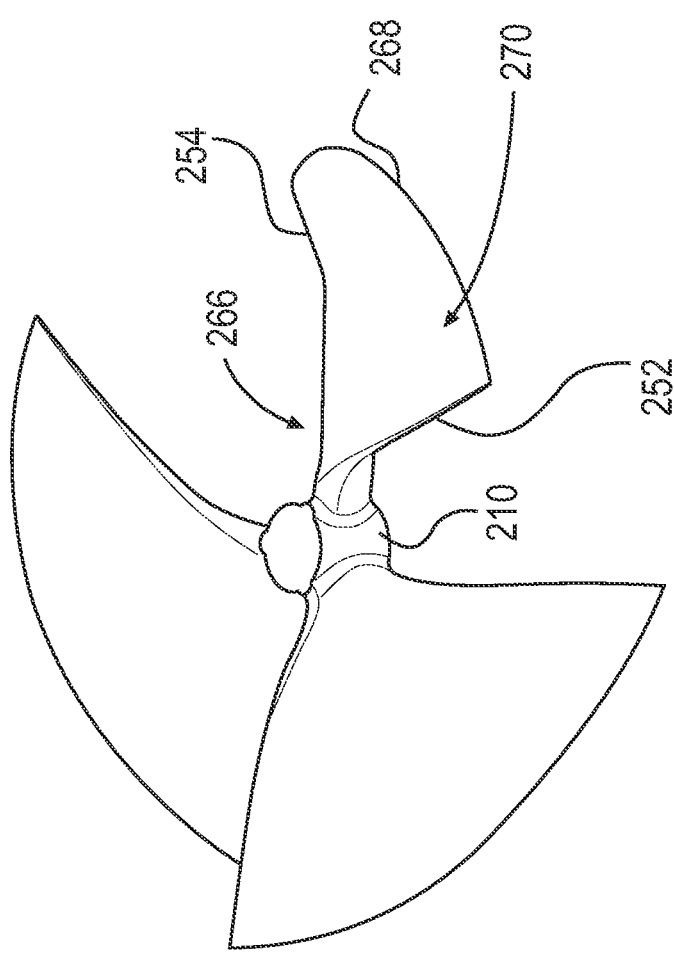
FIG. 10 is a perspective view of an alternative embodiment of a propeller.

As shown at least in FIGS. 3, 9, and 10, each blade of the at least one blade 250 extends from a proximal attachment end 266 to a blade tip 268. In the example shown in FIG. 3, the proximal attachment end 266 is attached to the central hub 210.

Each blade of the at least one blade 250 has a leading edge 252 and a trailing edge 254. Each of the leading edge 252 and the trailing edge 254 extend from the proximal attachment end 266 to the blade tip 268.

Each blade of the at least one blade 250 also includes a front surface 260 and a back surface 262. In the examples shown, the front surface 260 extends between the leading edge 252 and the trailing edge 254 from the proximal attachment end 266 to the blade tip 268. Also in the examples shown, the back surface 262 extends between the leading edge 252 and the trailing edge 254 from the proximal attachment end 266 to the blade tip 268.

Figure 6:
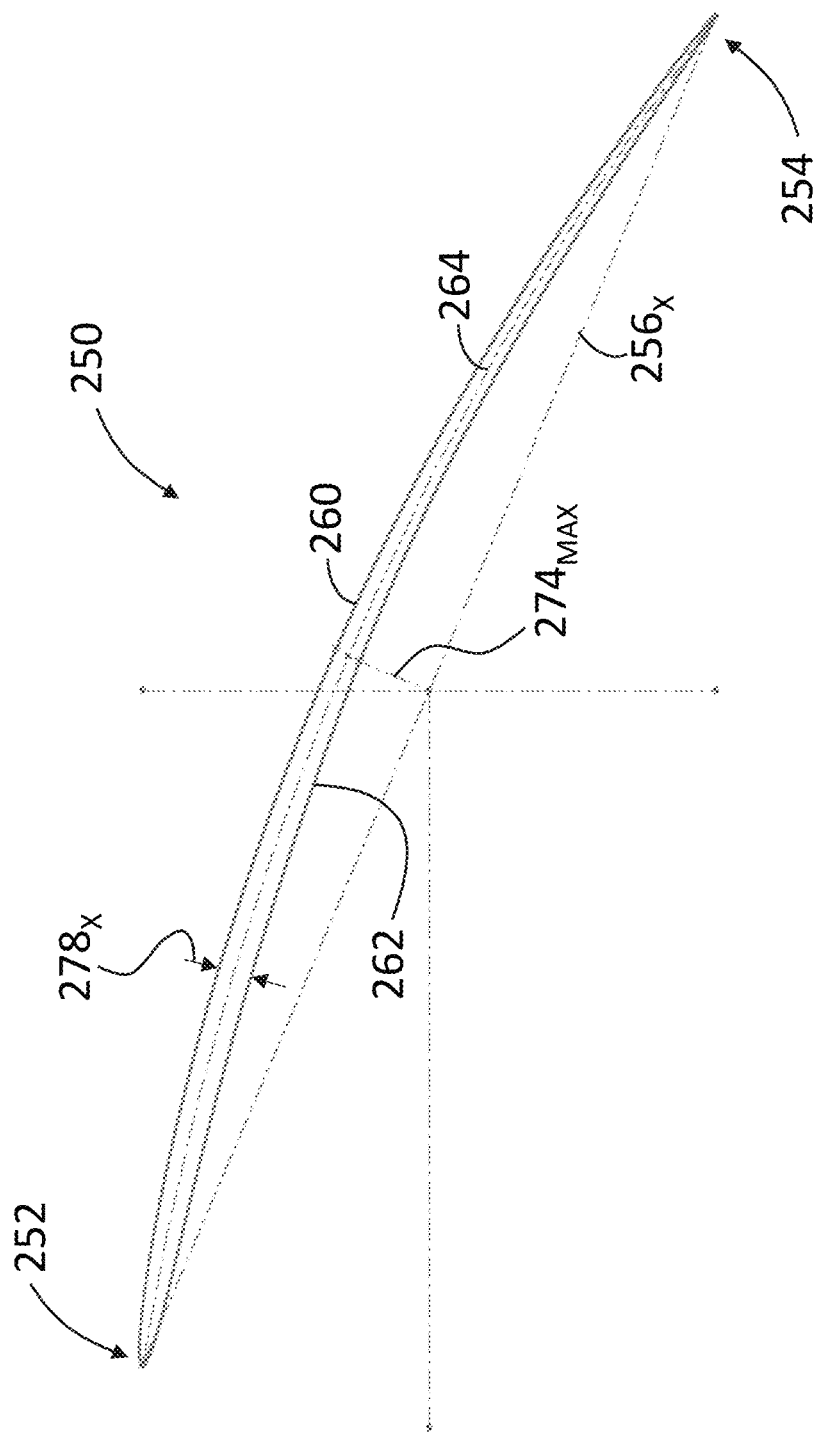
FIG. 6 is a cross-sectional view of an alternative embodiment of a blade.

Similar to blade 150 discussed above in reference to FIG. 1, each blade of the at least one blade 250 includes a mean camber line; see, for example, FIG. 6. As shown in FIG. 6, the mean camber line 264 extends from the leading edge 252 to the trailing edge 254 halfway between the front surface 260 and the back surface 262.

Figure 11:
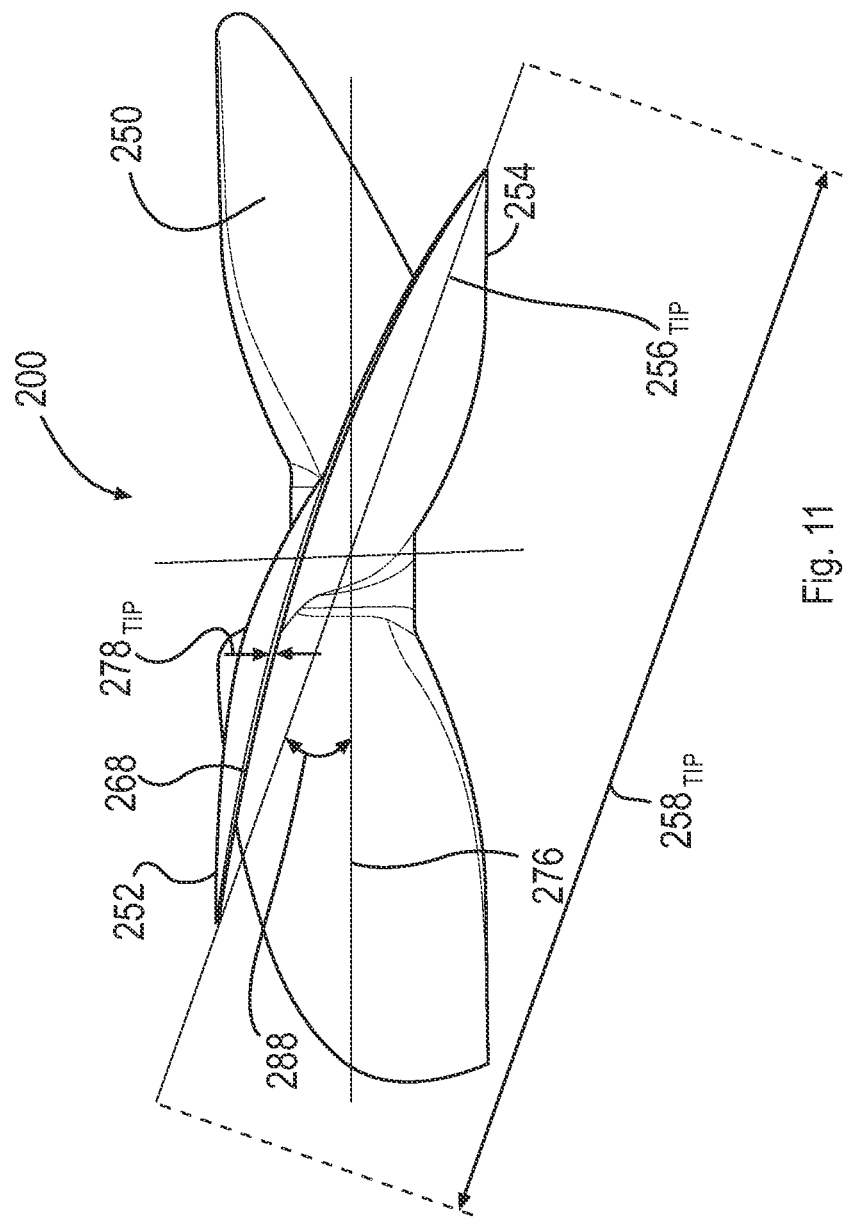
FIG. 11 is a side view of the propeller of FIG. 10.

Also similar to blade 150, each blade of the at least one blade 250 includes a chord line at each point along each blade 250 from the proximal attachment end 266 to the blade tip 268. Referring to FIG. 5, an example chord line at the blade tip 268 is shown, i.e., $256_{TIP}$. Referring now to FIG. 6, a second example a chord line, $256_X$, is shown at a position "X" along an example of the blade 250 between the proximal attachment end 266 and the blade tip 268. Referring now to FIG. 11, a third example chord line at the blade tip 268 of a second embodiment of propeller 200 is shown. As demonstrated in FIGS. 5, 6 and 11, and described in reference to FIG. 1 above, a chord line is defined by a straight line that extends from the leading edge 252 to the trailing edge 254 at each point along a blade 250. Accordingly, the chord length of each chord line may vary along the blade 250 from the proximal attachment end 266 to the blade tip 268. For example, at location "A" in FIG. 4, there is a chord line 256a that extends from leading edge 252 to the trailing edge 254 and has a corresponding chord length. At location "B" in FIG. 4, there is chord line 256b that extends from leading edge 252 to the trailing edge 254 and has a corresponding chord length that is greater than that at location "A". The chord length is the length of the chord line: see for example FIG. 5. In FIG. 5, the chord length at the blade tip is shown as $258_{TIP}$. As 256a and 256b are projections of the chord lines at locations "A" and "B" in a plane not parallel to the chord line, the length of lines 256a and 256b are not true representations of the chord length at these locations (they are shorter than the actual chord lines).

As shown in FIGS. 2-16, the chord length of blade 250 may be maximized in a blade tip region 270 of the blade 250. As highlighted in FIG. 4, the blade tip region 270 extends from a proximal border 272 to the blade tip 268. In some examples of the propeller 200, the proximal border 272 is located toward the blade tip 268 by at least 75% of the distance from the proximal attachment end 266 to the blade tip 268. In other examples of the propeller 200, the proximal border 272 is located toward the blade tip 268 by at least 87.5% of the distance from the proximal attachment end 266 to the blade tip 268. In yet another preferred example, the proximal border 272 is located toward the blade tip 268 by at least 90% of the distance from the proximal attachment end 266 to the blade tip 268.

In the various embodiments of propeller 200, at each point along the blade 250 in the blade tip region 270, the blade 250 defines a maximum camber that is between 3% and 10% of the chord length at that point. An example of the maximum camber of blade 250 at a position "X" along an example of the blade 250 between the proximal attachment end 266 and the blade tip 268 is shown in FIG. 6 as $274_{MAX}$. As was described in reference to blade 150, the maximum camber is the maximum distance from the mean camber line to the chord line at that point along the blade 250. In some examples of the propeller 200, at each point along the blade 250 from the proximal attachment end 266 to the blade tip 268, that is, not limited to the blade tip region 270, the blade 250 may define a maximum camber between 3% and 10% of the chord length at that point.

In some examples of the propeller 200, the average of camber percentages taken at each point along the blade from the proximal attachment end 266 to the blade tip 268 may be between 4% and 8%. A camber percentage is a percentage calculated by dividing the maximum camber at a point along the blade by the chord length at that point. For example, referring to FIG. 1, the camber percentage at that point along the blade 150 would equal the value of $166_{MAX}/158$. Since $166_{MAX}$ and 158 are both distance measurements, the camber percentage is a unitless value. Therefore, the average of camber percentages taken at each point along the blade can be calculated by first determining each camber percentage at each point along the blade from the proximal attachment end 266 to the blade tip 268, and then dividing that sum by the number of points.

Referring again to FIG. 4, each blade of the at least one blade 250 has a first portion 280, a second portion 282, a third portion 284, and a fourth portion 286. The first portion 280 may include the 25% of the blade 250 starting at the proximal attachment end 266 extending towards the blade tip 268. The second portion 282 may include the 25% of the blade 250 immediately following the first portion 280. The third portion 284 may include the 25% of the blade 250 immediately following the second portion 282, and the fourth portion 286 may include the 25% of the blade immediately following the third portion 284 and ending at the blade tip 268.

Figure 4:
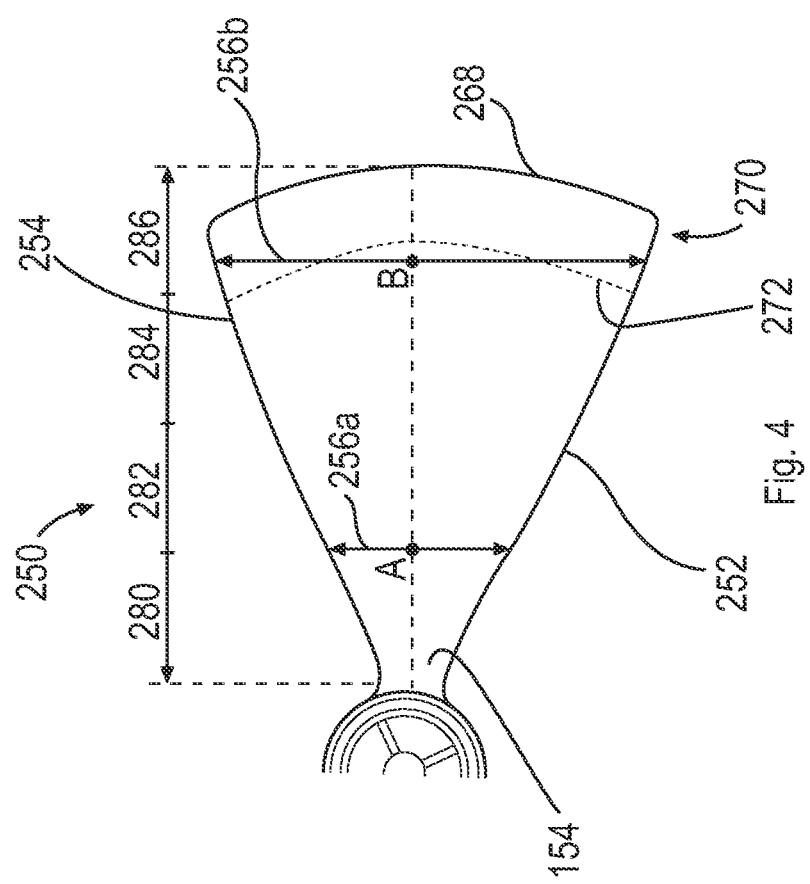
FIG. 4 is an enlarged top view of one blade of the propeller of FIG. 2.
Figure 5:
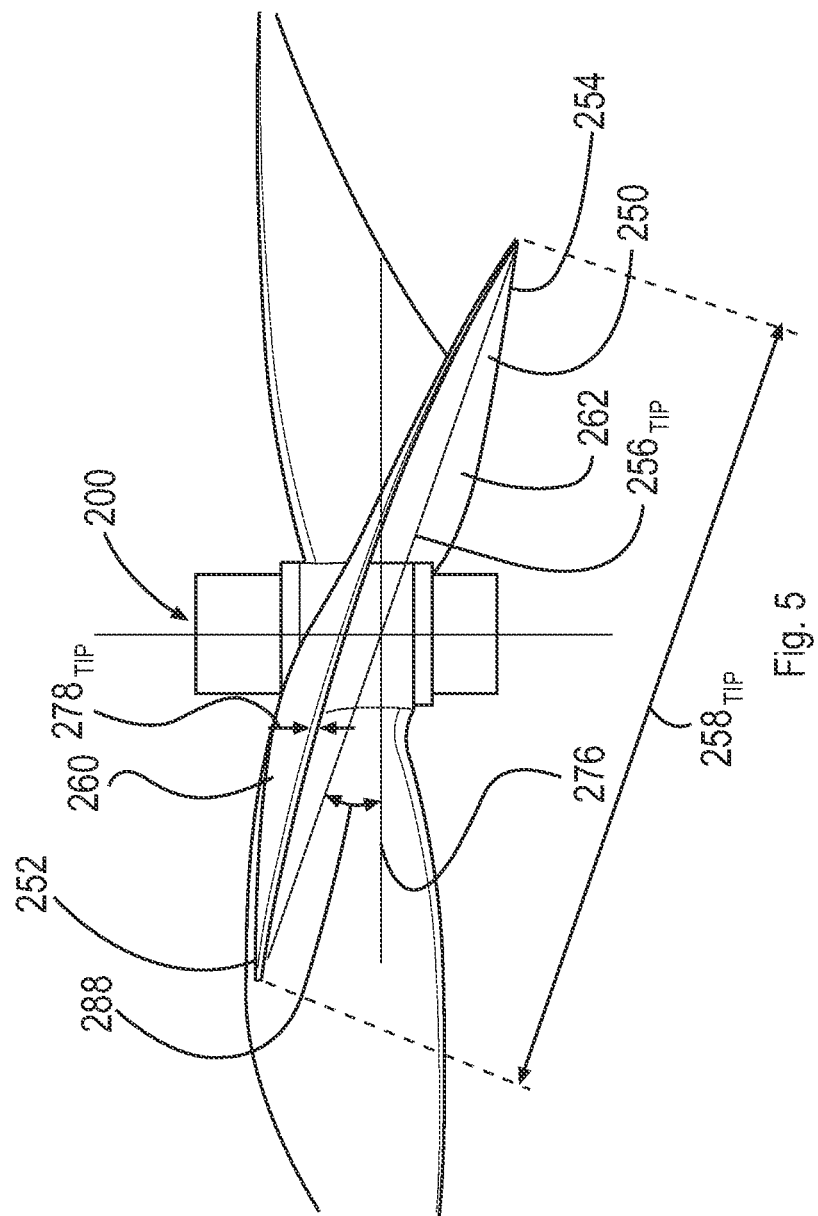
FIG. 5 is a side view of the propeller of FIG. 2.

In some examples of the propeller 200, see for example FIG. 4, the average chord length in the fourth portion 286 may be greater than the average chord length in the third portion 284, the average chord length in the third portion 284 may be greater than the average chord length in the second portion 282, and the average chord length in the second portion 282 may be greater than the average chord length in the first portion 280. The average chord lengths can be determined by summing chord lengths at each point along the blade 250 in the respective portions 280, 282, 284, 286 and dividing by the number of points in that section. By maximizing chord length in the blade tip region 270, a dramatic increase in thrust force may be produced, resulting in a higher thrust coefficient compared to a propeller of the same diameter that does not utilize maximum chord length in the blade tip region. This finding is due to the blade tip region 270 being the area of greatest angular velocity; therefore, the area with the ability to induce the greatest mass of fluid at the greatest velocity.

In some examples of the propeller 200, each blade of the at least one blade 250 is generally triangular. For example, in some embodiments of the blade 250, the average chord length of the first portion 280 may be within 25% of a constant multiplied by 12.5% of the distance (measured radially from central axis of rotation 230) from the proximal attachment end 266 to the blade tip 268, the average chord length of the second portion 282 may be within 25% of the constant multiplied by 37.5% of the distance from the proximal attachment end 266 to the blade tip 268, the average chord length of the third portion 284 may be within 25% of the constant multiplied by 62.5% of distance from the proximal attachment end 266 to the blade tip 268, and the average chord length of the fourth portion 286 may be within 25% of the constant multiplied by 87.5% of the distance from the proximal attachment end 266 to the blade tip 268.

In another example, the average chord length of each of the first, second, third, and fourth portions 280, 282, 284, 286, may be within 12.5% of a constant multiplied by 12.5%, 37.5%, 62.5%, and 87.5%, respectively, of the distance from the proximal attachment end 266 to the blade tip 268. In another example of propeller 200, the average chord length of each of the first, second, third, and fourth portions 280, 282, 284, 286, may be within 7.5% of a constant multiplied by 12.5%, 37.5%, 62.5%, and 87.5%, respectively, of the distance from the proximal attachment end 266 to the blade tip 268. In preferred example of the propeller 200, the average chord length of each of the first, second, third, and fourth portions 280, 282, 284, 286, may be within 5% of a constant multiplied by 12.5%, 37.5%, 62.5%, and 87.5%, respectively, of the distance from the proximal attachment end 266 to the blade tip 268.

In some examples of the propeller 200, at each point along the blade 250 in the blade tip region 270, the blade 250 may have a maximum thickness between 0.01% and 5% of the chord length at that point along the blade 250. In other examples, the maximum thickness at each point along the blade 250 in the blade tip region 270 may be between 0.1% and 3% of the chord length at that point along the blade 250.

In yet another example of the propeller 200, at each point along the blade 250 from 50% of the distance from the proximal attachment end 266 to the blade tip 268, to the blade tip 268, each blade of the at least one blade 250 may have a maximum thickness between the front surface 260 and the back surface 262, the maximum thickness being between 0.01% to 10% of the chord length at that point along the blade 250. In yet another preferred example, at each point along the blade 250 from 50% of the distance from the proximal attachment end 266 to the blade tip 268, to the blade tip 268, each blade of the at least one blade 250 has a maximum thickness between the front surface 260 and the back surface 262, the maximum thickness being between 0.01% to 5% of the chord length at that point along the blade 250. The thickness 278 is distance measured between the front surface 260 and the back surface 262. For example, in FIG. 5, the blade tip thickness, $278_{TIP}$, is shown. As a second example, the thickness at location "X" along an example of a blade 250 is shown in FIG. 6 as $278_X$.

In some examples of the propeller 200, each blade 250 may, on average, become thinner as the blade 250 extends from the proximal attachment end 266 to the blade tip 268. For example, in some examples of the propeller 200 the average maximum thickness in the first portion 280 is greater than the average maximum thickness of the blade in the second portion 282, the average maximum thickness of the blade in the second portion 282 is greater than the average maximum thickness of the blade in the third portion 284, and the average maximum thickness of the blade in the third portion 284 is greater than the average maximum thickness of the blade in the fourth portion 286.

It should be noted that although certain features of the various embodiments of the propeller 200 are described in reference to one example, and other features of the propeller 200 are described with reference to a second example, the various embodiments of the propeller 200 are not limited to the features of one example and not the second example. For example, each blade 250 of an example of the propeller 200 may (a) have an average of camber percentages taken at each point along the blade from the proximal attachment end 266 to the blade tip 268 between 4% and 8%; (b) have a maximum thickness between 0.01% and 10% of the chord length at that point along the blade; and (c) may become thinner as the blade 250 extends from the proximal attachment end 266 to the blade tip 268.

Referring, for example, to FIG. 5, in each embodiment of the propeller 200, each blade of the at least one blade 250 defines a blade angle 288 measured between a plane 276 orthogonal to the central axis of rotation 230 and the chord line of the blade 250. In some examples, the blade angle 288 varies along the blade 250 from the proximal attachment end 266 to the blade tip 268. In some examples, the blade angle 288 may be between 13° and 25° at the blade tip. In another example, the blade angle 288 may be between 15° and 25° at the blade tip.

Figure 12:
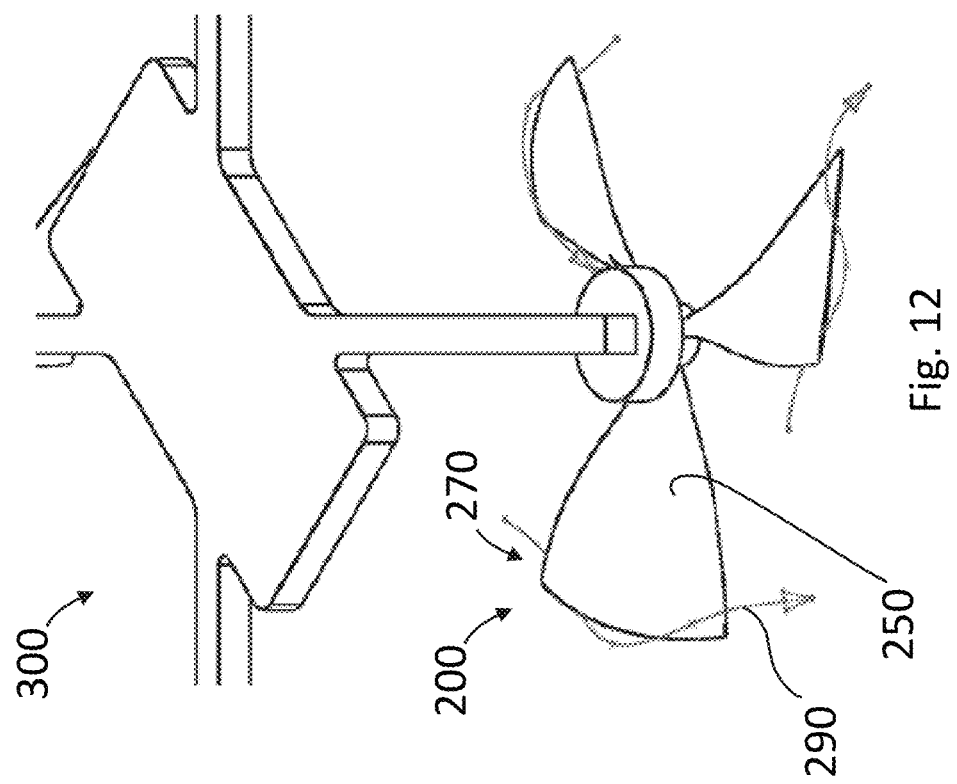
FIG. 12 is a partial perspective view of the propeller of FIG. 2 in use on an aircraft.
Figure 13:
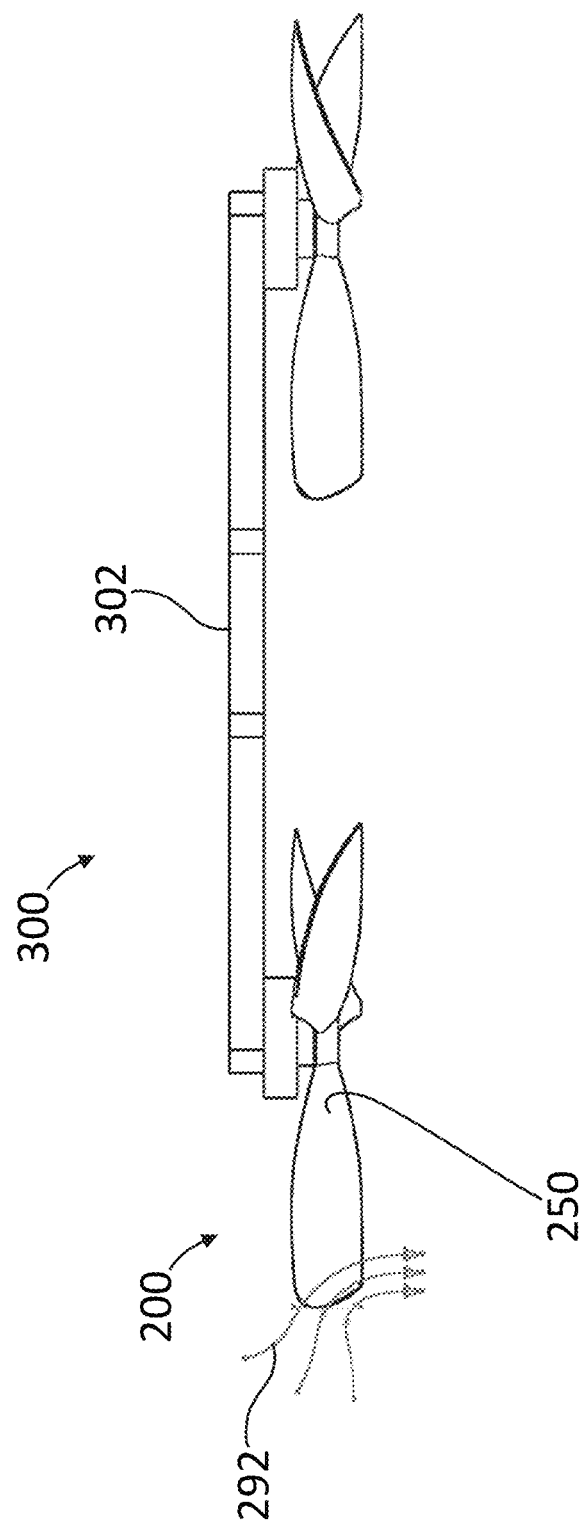
FIG. 13 is a side view of the propeller of FIG. 2 in use on the aircraft of FIG. 12.
Figure 14:
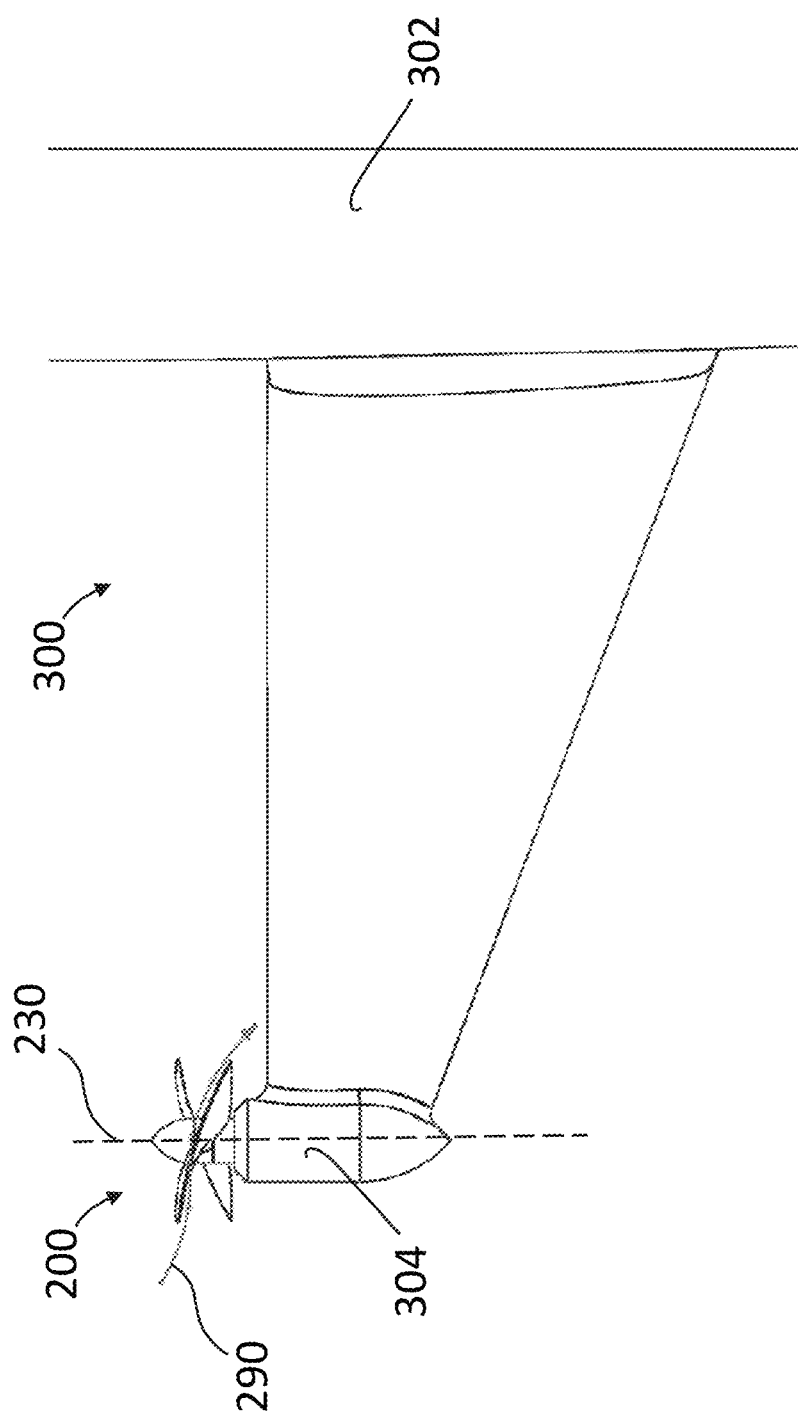
FIG. 14 is a side view of an alternative example of a propeller in use on an alternative example of an aircraft.

Referring now to FIGS. 12-14, shown therein are various examples of the propeller 200 as described above attached to an aircraft 300. As shown, the aircraft 300 may include a frame 302. The motor 304 may be supported by the frame 302, and may be operatively coupled to the propeller 200 to rotate the propeller 200 about the central axis of rotation 230. As shown in FIGS. 12 and 13, the aircraft 300 may be a drone. In other examples, see, for example, FIG. 14, the aircraft 300 may be a passenger aircraft. In both of these examples, the aircraft 300 may be manned or unmanned. In some examples, when the aircraft 300 is a drone, the aircraft 300 may be controlled by an operator. In other examples, when the aircraft 300 is a drone, the drone may be autonomous and may be controlled by a pre-programmed flight computer. In all examples, when the aircraft 300 is a drone, the drone may be used to transport an individual, but that individual may not have control of the flight path of the aircraft 300.

Figure 15:
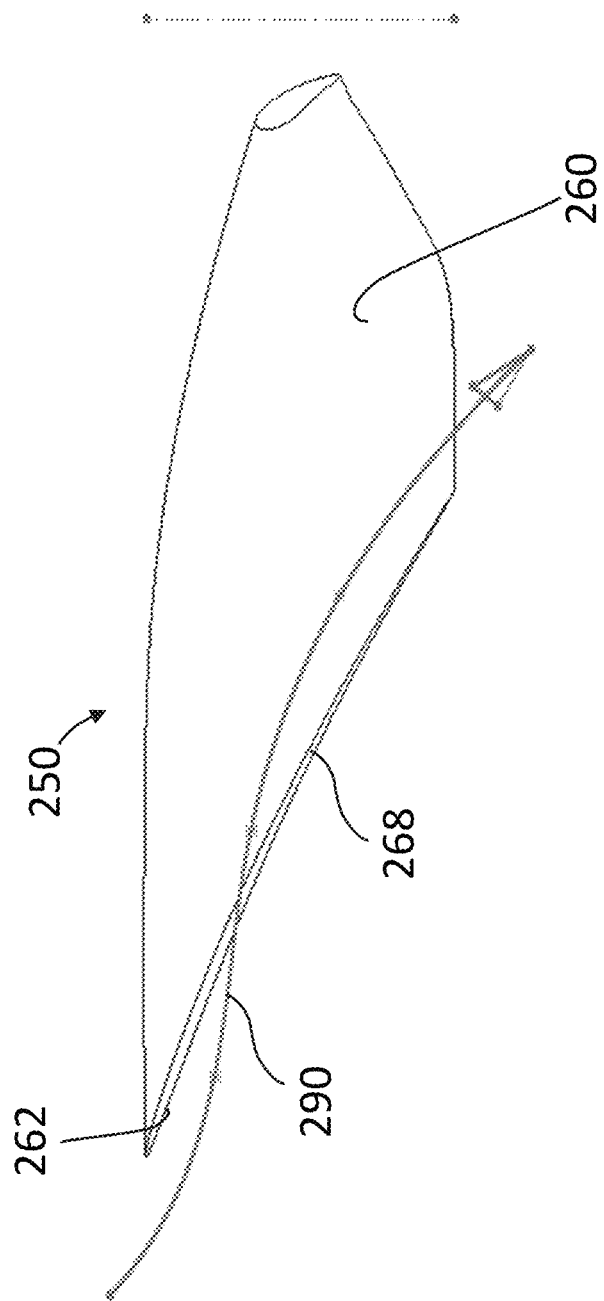
FIG. 15 is a perspective view of a propeller and displays an airflow path.
Figure 16:
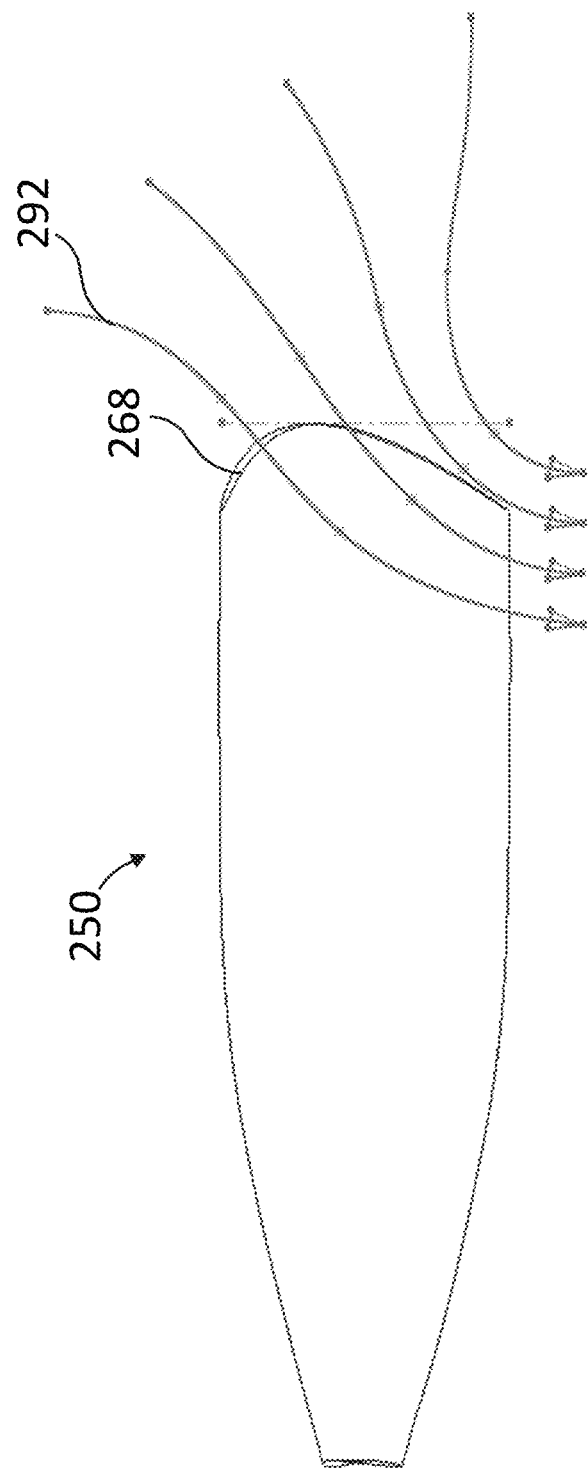
FIG. 16 is a front view of a propeller and displays a radial-free stream airflow path.

As stated above, the design of the various embodiments of the propeller 200 described herein allows for the greatest pressure differential to be generated in the blade tip region 270 which allows the blades 250 to utilize tip vortices. Example paths of travel of tip vortices 290 are shown in FIGS. 12, 14, and 15. As shown in the FIGS., the tip vortices 290 travel from the high-pressure back surface 262 of blades 250 to the low-pressure front surface 260 around the blade tip 268. Not only does the design of the propeller 200 described herein allow for tip vortices 290 to travel around the blade tip 268, but the design may also allow for a radial-free stream of air 292, see FIGS. 13 and 16, from beyond blade tip 268 to be pulled through the propeller 200. The radial-free stream 292 may be generated as the propeller 200 creates the greatest dynamic pressure at the blade tip region 270 on the front surface 260. Since the propeller design draws the radial-free stream 292 into the cylinder of the propeller and accelerates it towards the trailing edge 268, the mass flow and acceleration of air across the blade 250 may be increased, and therefore, so might the thrust output.

Since the propeller 200 is designed to utilize the radial-free stream 292 and tip vortices 290, in examples where the propeller 200 described herein is to be used within a shroud or duct, the shroud or duct may be required to be loose fitting. It has been found that a shroud wall clearance of about 10% of the blade tip chord length allows for the radial-free stream 292 and tip vortices 290 to be generated and used as effective mass flow.

The present invention has been described here by way of example only. Various modification and variations may be made to these exemplary embodiments without departing from the spirit and scope of the invention, which is limited only by the appended claims.

I claim:

1. A propeller comprising:
   a central hub mountable for drivable rotation about a central axis of rotation; and
   at least one blade extending from the central hub and rotatable about the central axis of rotation by the central hub to generate a backward airflow;
   wherein the at least one blade,
      extends from a proximal attachment end attached to the central hub to a blade tip, distal from the central hub;
      comprises a leading edge extending from the proximal attachment end to the blade tip, and a trailing edge extending from the proximal attachment end to the blade tip;
      comprises a front surface extending between the leading edge and the trailing edge from the proximal attachment end to the blade tip, and a back surface extending between the leading edge and the trailing edge from the proximal attachment end to the blade tip; and
   at each point along the blade from the proximal attachment end to the blade tip, the blade:
      defines a mean camber line extending between the leading edge and the trailing edge halfway between the front surface and the back surface; and
      defines a chord line extending straight between the leading edge and the trailing edge, wherein a chord length of the chord line varies along the blade from the proximal attachment end to the blade tip, the at least one blade defining a maximum chord length in a blade tip region of the blade at a location spaced proximally from the blade tip, the blade tip region extends from a proximal border to the blade tip, and the proximal border is located toward the blade tip by at least 75% of a distance from the proximal attachment end to the blade tip,
   wherein the blade defines a maximum camber between 3% and 10% of the chord length at each point along the blade in the blade tip region, and the maximum camber equals a maximum distance from the mean camber line to the chord line at any point along the blade from the leading edge to the trailing edge.

2. The propeller as defined in claim 1, further comprising a plurality of blades.

3. The propeller as defined in claim 1, wherein at each point along the blade from the proximal attachment end to the blade tip region, the blade defines the maximum camber between 3% and 10% of the chord length at that point.

4. The propeller as defined in claim 1, wherein the proximal border of the blade tip region is located at least 87.5% of the distance from the proximal attachment end to the blade tip.

5. The propeller as defined in claim 1, wherein each blade has a first portion, a second portion, a third portion, and a fourth portion, the first portion comprising 25% of the blade starting at the proximal attachment end, the second portion comprising 25% of the blade immediately following the first portion, the third portion comprising 25% of the blade immediately following the second portion, and the fourth portion comprising 25% of the blade immediately following the third portion and ending at the blade tip, wherein an average chord length in the fourth portion is greater than an average chord length in the third portion, the average chord length in the third portion is greater than an average chord length in the second portion, and the average chord length in the second portion is greater than an average chord length in the first portion.

6. The propeller as defined in claim 5, wherein
at each point along the blade from the proximal attachment end to the blade tip, a camber percentage is a percentage of the maximum camber relative to the chord length at that point;
an average of the camber percentages taken at each point along the blade from the proximal attachment end to the blade tip is between 4% and 8%;
each blade of the at least one blade has a maximum thickness between 0.01% to 10% of the chord length at that point along the blade; and
for each blade an average maximum thickness in the first portion is greater than an average maximum thickness of the blade in the second portion, the average maximum thickness of the blade in the second portion is greater than an average maximum thickness of the blade in the third portion, and the average maximum thickness of the blade in the third portion is greater than an average maximum thickness of the blade in the fourth portion.

7. The propeller as defined in claim 5, wherein,
the average chord length of the first portion is within 25% of a constant multiplied by 12.5% of the distance from the proximal attachment end to the blade tip,
the average chord length of the second portion is within 25% of the constant multiplied by 37.5% of the distance from the proximal attachment end to the blade tip,
the average chord length of the third portion is within 25% of the constant multiplied by 62.5% of distance from the proximal attachment end to the blade tip, and
the average chord length of the fourth portion is within 25% of the constant multiplied by 87.5% of the distance from the proximal attachment end to the blade tip.

8. The propeller as defined in claim 5, wherein,
the average chord length of the first portion is within 12.5% of a constant multiplied by 12.5% of the distance from the proximal attachment end to the blade tip,
the average chord length of the second portion is within 12.5% of the constant multiplied by 37.5% of the distance from the proximal attachment end to the blade tip,
the average chord length of the third portion is within 12.5% of the constant multiplied by 62.5% of distance from the proximal attachment end to the blade tip, and
the average chord length of the fourth portion is within 12.5% of the constant multiplied by 87.5% of the distance from the proximal attachment end to the blade tip.

9. The propeller as defined in claim 1, wherein at each point along the blade from the proximal attachment end to the blade tip, a camber percentage is a percentage of the maximum camber relative to the chord length at that point; and
an average of the camber percentages taken at each point along the blade from the proximal attachment end to the blade tip is between 4% and 8%.

10. The propeller as defined in claim 1, wherein, at each point along the blade in the blade tip region, each blade of the at least one blade has a maximum thickness between the front surface and the back surface, the maximum thickness being between 0.01% to 5% of the chord length at that point along the blade.

11. The propeller as defined in claim 10, wherein, at each point along the blade in the blade tip region, the maximum thickness is between 0.1% to 3% of the chord length at that point along the blade.

12. The propeller as defined in claim 1, wherein, at each point along the blade from 50% of the distance from the proximal attachment end to the blade tip, each blade of the at least one blade has a maximum thickness between the front surface and the back surface, the maximum thickness being between 0.01% to 10% of the chord length at that point along the blade.

13. The propeller as defined in claim 1 wherein each blade of the at least one blade, defines a blade angle measured between a plane orthogonal to the central axis of rotation and the chord line of the blade; such that
the blade angle varies along the blade from the proximal attachment end to the blade tip; and,
the blade angle is between 13° and 25° at the blade tip.

14. An aircraft comprising:
the propeller as defined in claim 1;
a motor operatively coupled to the propeller to rotate the propeller about the central axis of rotation; and,
a frame for supporting the propeller and the motor.

15. The aircraft as defined in claim 14, wherein the aircraft is a drone comprising a flight control computer.

* * * * *